(12) United States Patent
Ray

(10) Patent No.: US 7,539,275 B2
(45) Date of Patent: May 26, 2009

(54) ANALOG TO FEATURE CONVERTER FOR SIGINT APPLICATIONS

(75) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 593 days.

(21) Appl. No.: 11/379,486

(22) Filed: Apr. 20, 2006

(65) Prior Publication Data
US 2007/0183546 A1 Aug. 9, 2007

Related U.S. Application Data

(60) Provisional application No. 60/765,635, filed on Feb. 6, 2006.

(51) Int. Cl.
*H04B 1/10* (2006.01)
*H04B 17/02* (2006.01)

(52) U.S. Cl. .......................... 375/349; 455/133
(58) Field of Classification Search ................. 375/260, 375/267, 285, 316, 346–350; 455/132–133, 455/137–138; 370/210, 343–344, 350
See application file for complete search history.

(56) References Cited

U.S. PATENT DOCUMENTS

| | | | | |
|---|---|---|---|---|
| 5,896,405 A | * | 4/1999 | Moon | 714/795 |
| 6,744,821 B1 | * | 6/2004 | Van Acker et al. | 375/260 |
| 7,002,945 B2 | * | 2/2006 | Ichiyoshi | 370/342 |
| 7,095,778 B2 | * | 8/2006 | Okubo et al. | 375/130 |
| 2004/0184561 A1 | * | 9/2004 | Harada et al. | 375/316 |

OTHER PUBLICATIONS

The Arithmetic Fourier Transform—D.W. Tufts and G. Sadasiv—IEEE ASSP Magazine, Jan. 1988.

* cited by examiner

*Primary Examiner*—Khanh C Tran
(74) *Attorney, Agent, or Firm*—McNees Wallace Nurick, LLC

(57) ABSTRACT

A specially constructed analog processing block ahead of the traditional ADC within a typical RF front-end involving an antenna, filter, LNA, and AGC is provided. This analog block includes a structured matrix of controllable analog delay elements together with analog summers. The analog block can be used to form spectral estimates, narrow band filters, DS-SS detection, and more. The structured matrix can be programmed in order to implement SIGINT applications involving detection and characterization of communication signals.

22 Claims, 2 Drawing Sheets

ANALOG TO FEATURE CONVERTER FOR SIGINT APPLICATIONS

CROSS REFERENCE TO RELATED APPLICATIONS

This application claims the benefit of U.S. Provisional Patent Application Ser. No. 60/765,635 filed Feb. 6, 2006.

BACKGROUND OF THE INVENTION

The present invention is directed to a method for processing radio-frequency (RF) signals for Signals Intelligence (SIGINT) applications, and more particularly to an Analog-to-Digital Converter (ADC) analog processing block for pre-processing a signal prior to insertion of the signal to an ADC.

Signals intelligence, commonly referred to as SIGINT, involves searching a large bandwidth of RF spectrum for signals of interest (SOI). Traditionally, SIGINT methods require very high-speed ADCs and extensive processing resources. As more of the RF spectrum becomes allocated for communications, and as communications signals cover wider frequency bands, there are increasing performance requirements placed on the ADC and the associated backend processing system.

For SIGINT applications that cover a wide bandwidth, the sampling rate and the resolution must increase in order to maintain the same overall system performance. The number of interfering signals increases as the amount of RF spectrum that is captured by the ADC increases. The strongest signal detected by the ADC gets mapped by the ADC to a constant voltage, so weaker signals decrease in voltage as the interfering signals get stronger. Hence more processing bits are required in order to resolve the weaker signals of interest.

The primary factors that appear to be limiting ADC performance are aperture jitter and comparator ambiguity. Aperture jitter is created within the sample-and-hold circuit in an ADC. Aperture jitter is related to the random variation in the sampling interval caused by noisy clocks, temperature drift and other instabilities. So to have both high resolution and high bandwidth requires significant improvements in timing. Comparator ambiguity results from the necessity of having each comparator determine, after the hold-time period, whether the result is a 0 or a 1. There is a certain probability that at least one comparator will be indecisive. Aperture jitter and comparator ambiguity have contributed to a decrease in the rate of performance improvement of ADCs, and indicate a trend of fewer SIGINT system improvements that may be achieved by advances in ADC.

Another impediment to SIGINT and ADC performance improvement is the backend SIGINT processing system. The processing performance of the backend SIGINT processing system is driven by the performance of the SIGINT system central processing unit (CPU). Generally, performance improvements have been following Moore's Law, which predicts that CPU performance will double approximately every 18 months. While this theory has held true in the past, recent studies have shown a downward trend in CPU performance advances as well. For example, a study by Ekman, Warg and Nilsson, "An In-Depth Look at Computer Performance Growth", shows that performance grew by 58% per year between 1985 and 1996. However, during the seven years of 1996-2004, performance increases have slowed to 41% per year. These slowing performance numbers are attributed to three effects:

Total dissipated power
Wire delay
Memory bottlenecks

The increase in total dissipated power arises primarily from leakage current caused by the smaller line widths needed to increase performance. Wire delay also stems from smaller feature sizes as wire diameters become smaller, as the wire length remains the same or increases. Memory bottlenecks result from larger memory devices that do not match the speeds of the newer CPUs with which the memories are associated. DRAM speeds only increase about 10% per year compared with much larger increases in the operating speed of CPUs.

In order to overcome the limitations of the prior ADC solutions, it is necessary for sampling rates to increase. A higher sampling rate allows a SIGINT system to process RF signals over a wider range of frequencies, as well as to process RF signals that have a very wide bandwidth. Ultra Wide-Band (UWB) systems, for example, already use 500 MHz of RF bandwidth. CPU performance must also increase correspondingly with the wider frequency ranges, in order to process the number of samples that increase proportionately with the frequency range.

Algorithmic performance improvements occur occasionally, however, the advances achieved by algorithmic performance improvements are generally unpredictable, and historically have evolved very slowly, relative to technological improvements in hardware. Often when the backend SIGINT processor fails to keep pace with the signal sampling rate, the default solution is to jettison the excess sampled signals. The SIGINT processor then processes only the most likely signals, or even randomly chosen signals.

Therefore, the entire modem digital SIGINT approach—that of digitizing a broad bandwidth and digitally processing every "signal" within the digitized bandwidth—results in RF signal processing inefficiencies. Some of these inefficiencies may be eliminated by other processing characteristics which are achievable due to the unique processing characteristics of SIGINT.

If a narrow band SOI can be detected reliably only above a certain signal to noise ratio (SNR), then only frequency bins of a certain minimum power need to be inspected. In some applications, SIGINT does not require processing RF signals with a great deal of fidelity. For example, a direct sequence spread spectrum signal detector might be able to use an ADC having only one bit, if the RF signals are properly scaled. Conventional architectures, however, do not benefit by this approach.

Sometimes a particular SIGINT problem only requires a determination that, for example, a certain signal exists, and has a particular modulation and baud rate. It may be unnecessary for the information that is contained within the signal to be demodulated and decoded. It may, for example, be sufficient to determine that the signal existed at a certain frequency at a certain time and, perhaps, at a certain location if the signal can be geo-located. In such a case, very low SNR signals would be candidates for SIGINT processing. The basic SIGINT algorithm could be revised in this case. The SIGINT sampling rate would only need to be sufficiently high to estimate the baud rate and modulation type, rather than meeting a more stringent sampling requirement that might apply if the SIGINT system were designed to demodulate and decode the RF signal itself. But this solution does not meaningfully affect the sampling rate parameters since, according to the Nyquist Theorem, a certain minimum signal sampling rate must be applied to properly sample the entire signal bandwidth.

Another type of SOI that hops in frequency and/or time may be detected simply by the duration of one of its hops. In this case, a first pass algorithm could just sample each frequency bin at the potential hop duration rate looking for one isolated sample with energy above threshold. The processing could adapt to a changing interference signal environment, thereby reducing the overall system requirements. For example, if the environment was free of interfering signals, the presence of a SOI could be determined using filters with wider RF bands, that require fewer taps, and hence less processing. This technique requires the SIGINT system to adapt in both frequency and time to constantly changing conditions.

For direct sequence, spread spectrum (DS-SS) signals, the only reliable means of detection is to have advance knowledge of the DS-SS signal sequence, and to use correlation to raise the DS-SS signal above the background noise. This type of detection means imposes an enormous burden on the backend SIGINT processor.

The various aforementioned techniques may, in some cases, have alternate means of implementation that do not require digitizing a very wide bandwidth and then processing every RF signal using a digital algorithm. However, implementation of these techniques requires the entire SIGINT architecture to be redesigned.

Currently, there is no practical means available for searching the entire 10 GHz of RF spectrum that is commonly used for communications. Most SIGINT systems are more specialized or are restricted to searching much narrower bandwidths. Prior solutions to the general SIGINT problem required sampling and processing of the entire RF spectrum by the SIGINT system. Sampling and processing the entire RF spectrum imposes a severe burden on the ADC and associated backend processor performance. Alternate methods which might use fewer samples and less processing resources are often times not possible to implement in prior solution architectures.

Therefore what is needed is a SIGINT system that does not require sampling and processing the entire RF spectrum and that may be implemented in existing SIGINT architectures.

SUMMARY OF THE INVENTION

The present invention is directed to a system for processing RF signals before providing the signals to an analog to digital converter, the system including an input interconnection array, and a delay matrix coupled to the input interconnection array. The system also includes a summing matrix coupled to the delay matrix. An output interconnection array is coupled to the summing matrix. A selection switch is coupled to the output interconnection array. Further, the system optionally includes a feedback path coupling the output interconnection to the input interconnection array. A control register is coupled to the input and output interconnection arrays, the delay matrix and the summing matrix.

The control register may be configured to receive instructions from a processing unit. The processing unit is programmed to generate at least one of a plurality of Fourier coefficients from the output interconnection array. The Fourier coefficients being defined by the following equation:

$$a_n = \Sigma_{j=1,3,5,\ldots N/n} \mu(j)(1/(2nj))\Sigma_{k=1,\ldots,2nj-1} (-1)^k A(k/(2nj)T)$$

wherein $a_n$=the sine coefficients of a periodic signal having a period T, $\mu(j)$ is a Moebius function having values −1, 0 and 1; and A(t) is a bandlimited RF signal.

In another aspect, the present invention is directed to a system for pre-processing RF signals before input to an analog to digital (A-D) converter. The system includes an input interconnection array having a plurality of signal processing paths for receiving an RF signal. A delay matrix has a plurality of signal processing paths with delay elements to receive the RF signal from the input interconnection array. The delay matrix is arranged to apply a predetermined variable delay to the RF signal in each of the plurality of signal processing paths. A summing matrix coupled to the delays matrix is configured to combine the delayed RF signal from at least two of the signal processing paths of the delay matrix. An output interconnection array is coupled to a selector switch. The output interconnection array has a plurality of output paths, and is coupled to the summing matrix for selectively forwarding at least one of the combined signals of the summing matrix to the selector switch. A control register is configured to receive instructions from a processing unit to control the input and output interconnection arrays, the delay matrix, and the summing matrix. An antenna for receiving RF signals is coupled to a wideband filter for filtering the RF signal for processing. An amplifier circuit amplifies the filtered signal and a gain control circuit for regulating the power of the RF signal for input to the input interconnection array. An A-D converter is coupled to the output of the selector switch for receiving the selected at least one of the combined RF signals and converting the combined RF signal to a digital representation of the combined RF signal. Optionally, a feedback path couples at least one of the combined signals of the summing matrix back to the input interconnection array.

The present invention is also directed to a method of analyzing RF spectrum. The method includes receiving an RF signal; filtering the RF signal through a wideband filter; amplifying the RF signal with a low-noise amplifier; controlling the power level of the RF signal for processing; applying the RF signal across a plurality of signal processing paths; introducing variable delay elements along each of the plurality of signal processing paths; combining at least two of the signal processing paths, after introducing the variable delay elements, according to a predetermined algorithm to create multiple simultaneous narrowband signal processing paths; and sampling the multiple simultaneous narrowband signal processing paths at a sampling rate which is dependent on the bandwidth of the signal processing path.

The predetermined algorithm may be selected from one of a plurality of Fourier coefficients, which can be calculated using delay and summation operations by using the arithmetic Fourier transform. For example, the sine Fourier coefficients may be calculated as by the following equation:

$$a_n = \Sigma_{j=1,3,5,\ldots N/n} \mu(j)(1/(2nj))\Sigma_{k=1,\ldots,2nj-1} (-1)^k A(k/(2nj)T)$$

wherein $a_n$=the sine coefficients of a periodic signal having a period T, $\mu(j)$ is a Moebius function having values −1, 0 and 1; and A(t) is a bandlimited RF signal.

It is an advantage of the present invention to provide the ability to handle much more difficult and demanding SIGINT problems with more degrees of freedom when designing such systems.

Another advantage of the present invention is the ability to create multiple simultaneous spectral components of a signal. Each spectral component can be sampled at the periodic rate of the respective spectral component, rather than at the original bandwidth.

Yet another advantage of the present invention is that it provides a direct implementation of an arithmetic Fourier transform.

A further advantage of the present invention is the ability to create multiple simultaneous narrowband channels, which can be sampled at the channel bandwidth rather than the original signal bandwidth.

Still another advantage of the present invention is the ability to provide direct programming of multiple simultaneous spreading sequence correlators for detection of DS-SS signals.

Another advantage of the present invention is the ability to share delay-sum resources across multiple simultaneous processing channels.

Finally, another advantage of the present invention is the ability to conserve analog processing resources through use of multiple delay-sum levels.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
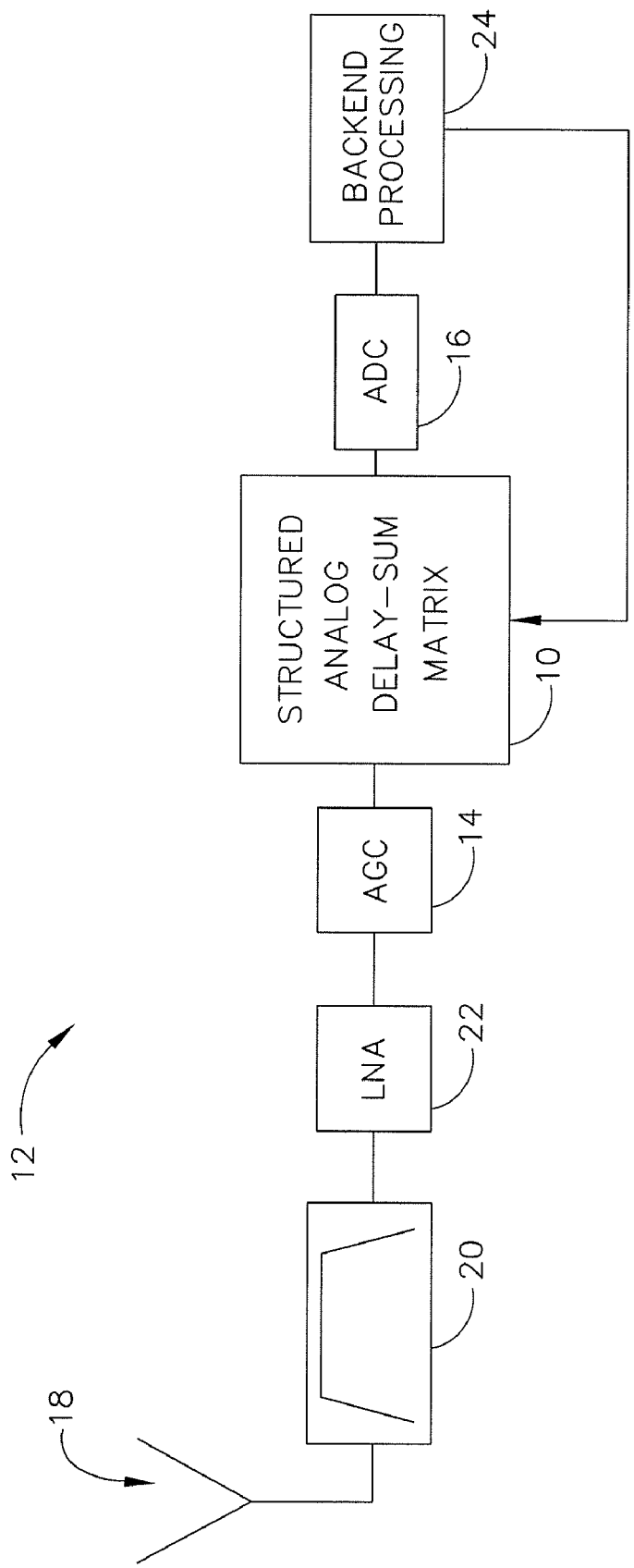
FIG. 1 is a block diagram of a SIGINT system applying the structured analog delay-sum matrix of the present invention.

Referring to FIG. 1, the present invention includes a specially constructed analog processing block, or structured analog delay-sum (SAD) matrix 10. In a SIGINT system 12, the SAD matrix 10 is connected between an Automatic Gain Control circuit (AGC) 14 and a traditional ADC 16. The RF front-end includes an antenna 18 for receiving a wide band RF signal; a filter 20 for filtering the incoming signal from the antenna; a low noise amplifier circuit (LNA) 22 for amplifying the output of the filter 20, and the AGC 14. The RF signal is forwarded from the AGC 14 to be processed by the SAD matrix 10, as described below in greater detail, and the processed RF signal is converted by the ADC 16. The output of the ADC 16 is connected to a SIGINT backend processor 24. The SIGINT backend processor 24 may be any backend processor that is well known to those skilled in the art for use in SIGINT applications.

The SAD matrix 10 consists of a structured matrix of controllable analog delay elements together with analog summers. This simple but flexible structure can be used to form spectral estimates, narrow band filters, DS-SS detection, and more. The invention also involves a approach that "programs" this structured matrix in order to implement SIGINT applications involving detection and characterization of communication signals.

The invention includes a structured matrix of delay-sum elements used to implement front-end filtering operations before providing the signal to an ADC 16, and a programmable setup and control register unit for programming the structured matrix to implement specific signal detection and characterization functions. There is also a method disclosed for combining these two features together with conventional SIGINT circuit components to address SIGINT applications.

Figure 2:
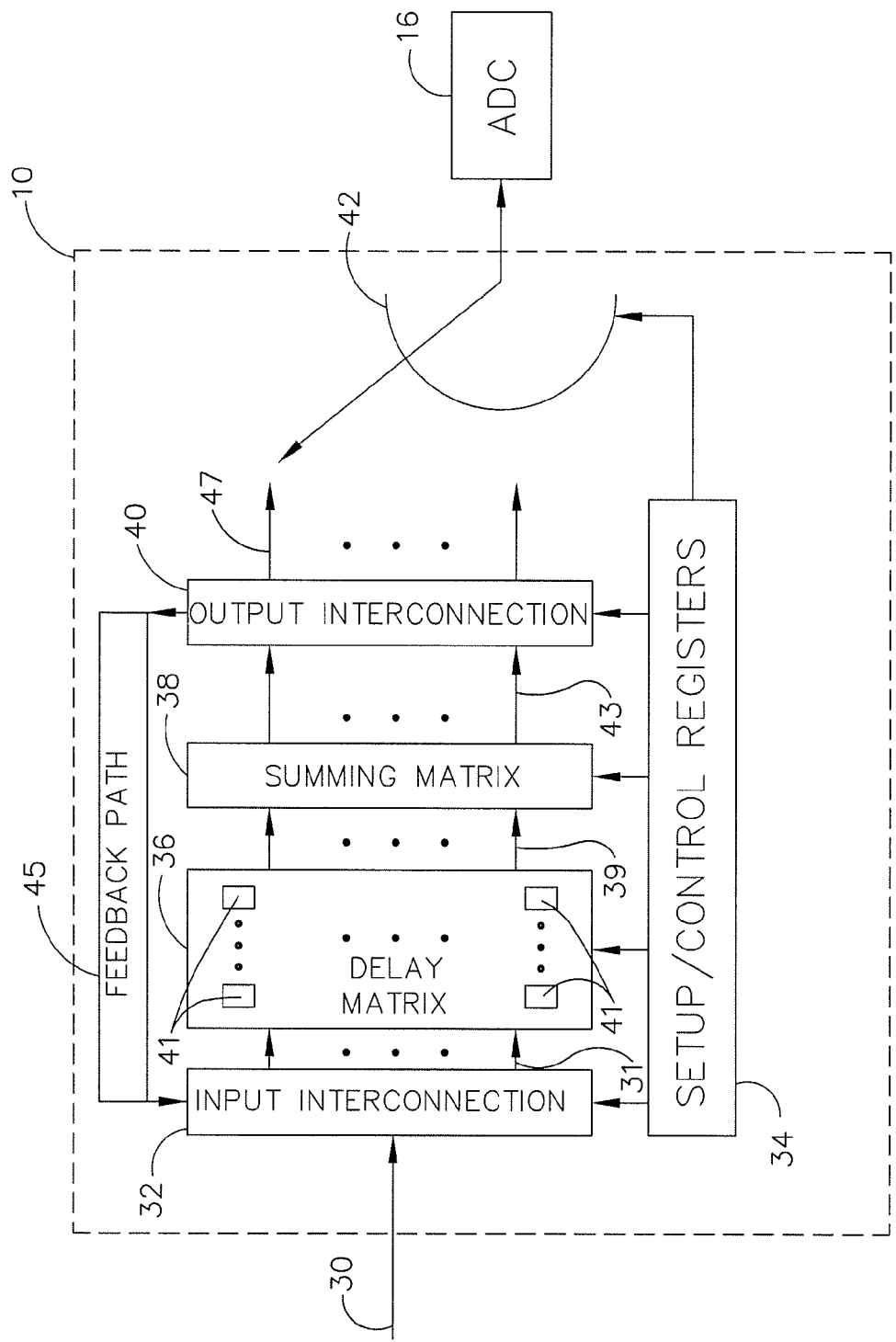
FIG. 2 is a diagram of the Structured Analog Delay-Sum Matrix of the present invention.

Referring to FIG. 2, the internal structure of the SAD matrix 10 is shown. An RF signal 30 is received by an input interconnection matrix or array 32. A control register 34 configures the input interconnection matrix 32 to forward the RF signal 30 to a delay matrix 36 over a first signal path 31. The configuration values set in the control register 34 are controlled by the backend processor 24. The delay matrix 36 includes a plurality of variable delay elements 41, each delay element 41 corresponding to one of the first signal paths 31 from the input interconnection matrix 32. Each delay element 41 of the delay matrix 36 has a variable delay, which is also configured by the control register 34. A summing matrix 38 receives the delay element outputs from a second signal path 39 and performs summation of various groups of delay element outputs. The predetermined groups for summation being configured by the control register 34. An output interconnection matrix or array 40 receives the output signals of the summing matrix 38 from a third signal path 43 and passes the signals to an ADC input selection switch 42, or back to the input interconnection matrix 32 for further delay-sum iteration. The matrix passes from the output signals 47 through a feedback path 45 to the input interconnection matrix 32. The feedback path 45 is optional and allows for more complex and precise signal filters. It is understood that the feedback path 45 is not required in order for the system to function.

The stated functionality of the SAD matrix 10 is produced through programming the delay sum matrix 10 to implement standard signal processing algorithms such as linear finite impulse response (FIR) filters and Fourier transforms. For example, the Fourier transform is implemented using the arithmetic Fourier transform algorithm: the N sine and cosine ($a_n$ and $b_n$) coefficients of a periodic signal, with period T are computed using only delays, additions and subtractions of samples of a bandlimited signal A(t) via Equation 1:

$$a_n = \Sigma_{j=1,3,5,\ldots N/n} \mu(j)(1/(2nj))\Sigma_{\kappa=1,\ldots,2nj-1}(-1)^k A(k/(2nj)T)$$ Equation 1

In Equation 1, $\mu(j)$ is the Moebius function which has values 0, 1, and −1. The formula for the $b_n$ coefficients is similar; therefore this calculation can be done with delay and summation elements only. For example, the positive and negative terms of the Moebius function may be separated. The separated terms may then be processed in analog circuitry using delays and sums, and the processed analog terms are then digitized and subtracted digitally. Alternatively, the subtraction may be performed through analog circuitry. Similarly, the constant 1/(2nj) that is shown as a division can be absorbed into the final sampling process.

Thus, the structured SAD matrix 10 can be programmed by the backend processor 24 and the control register 34, to produce one or more of the Fourier coefficients. This allows algorithms that require frequency information to sample at much lower rates (corresponding to the period of the signal instead of the highest frequency in the signal).

In an alternate embodiment, any type of linear FIR filter can also be implemented using the delay sum matrix 10. The FIR filter is a convolution operation defined by Equation 2, where $\{b_n\}$ represents the FIR filter coefficients (real or complex numbers), $\{x(n)\}$ is the input signal and $\{y_m\}$ is the output data:

$$y_m = \Sigma_{k=1,2,3,\ldots,N} b_k * x(m-(k-1)T)$$ Equation 2

The delay sum matrix 10 could also implement this equation because arbitrary linear filter responses such as those from the above equation can be approximated by FIR filters using only +1/−1 coefficients. These FIR filter responses may be further improved since the delays within them do not need to be uniformly sampled. Direct sequence spread spectrum signals may also be convolved with their defining Pseudo-Noise (PN)

sequence since convolution of direct sequence spread spectrum signals is defined with the same operation as shown in Equation 2.

The aforementioned delay-sum matrix and FIR filter techniques allow the RF signal to be pre-processed before sampling, to reduce the required sampling rate. Alternately, if an estimator is used to determine the baud rate of a particular narrow band signal, two separate methods involving delay and sum operations may be combined into a single delay-sum algorithm. The single delay-sum algorithm may be programmed into the SAD matrix 10 described above. In addition, in order to conserve on-chip resources in the SAD matrix 10, the output of one SAD matrix 10 can be configured as the input to another SAD matrix 10. The use of cascaded SAD matrices allows much more complicated networks to be formed from several simpler ones, thus saving on delay-sum elements.

Modeling and simulation of the operating parameters of the SAD matrix may be done to ensure that the SAD matrix 10 responds appropriately in the dynamic ranges required. Preferably, the SAD matrix 10 may be actively calibrated to reduce delay biases caused by temperature variations. Finally, the SAD matrix 10 may employ various methods to reduce the effects of on-chip process variations that cause delay and sum biases in the analog circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for processing RF signals before providing the signals to an analog to digital converter, the system comprising:
   an input interconnection array;
   a delay matrix coupled to the input connection array;
   a summing matrix coupled to the delay matrix;
   an output interconnection array coupled to the summing matrix;
   a selection switch coupled to the output interconnection array; and
   a control register coupled to the input and output interconnection arrays, the delay matrix, the selection switch and the summing matrix.

2. The system of claim 1 wherein:
   the input interconnection array has a plurality of signal processing paths for receiving an RF signal;
   the delay matrix has a plurality of signal processing paths with delay elements to receive the RF signal from the input interconnection array, the delay matrix being arranged to apply a predetermined variable delay to the RF signal in each of the plurality of signal processing paths of the delay matrix;
   the summing matrix being configured to combine the delayed RF signals from at least two of the signal processing paths of the delay matrix;
   the output interconnection array has a plurality of output paths, the output interconnection array being configured to selectively forward at least one of the combined signals of the summing matrix to the selection switch; and
   the control register being configured to receive instructions from a processing unit to control the input and output interconnection arrays, the delay matrix and the summing matrix.

3. The system of claim 1 wherein the system also comprises a feedback path coupling the output interconnection array to the input interconnection array.

4. The system of claim 2 wherein the system also comprises a feedback path coupling the output interconnection array to the input interconnection array, the feedback path being configured to provide at least one of the combined signals of the summing matrix to the input interconnection array.

5. The system of claim 2, wherein the processing unit is programmed to generate at least one of a plurality of Fourier coefficients from the output interconnection array.

6. The system of claim 5, wherein the plurality of Fourier coefficients are defined by the following equation:

$$a_n = \Sigma_{j=1,3,5,\ldots N/n} \mu(j)(1/(2nj))\Sigma_{k=1,\ldots,2nj-1}(-1)^k A(k/(2nj)T)$$

wherein $a_n$=sine coefficients of a periodic signal having a period=T;
$\mu(j)$=a Moebius function having values −1, 0 and 1; and
$A(t)$=a bandlimited RF signal.

7. The system of claim 5, wherein the plurality of Fourier coefficients being defined by cosine coefficients of a periodic signal.

8. The system of claim 5, wherein a sampling rate is determined as a function of the period of the signal.

9. The system of claim 5, wherein the at least one of a plurality of Fourier coefficients is generated by the processing unit and implemented by the control register to process the RF signal as a function of the at least one of a plurality of Fourier coefficients.

10. The system of claim 6, wherein the at least one of a plurality of Fourier coefficients is generated by the processing unit and implemented by the control register to process the RF signal as a function of the at least one of a plurality of Fourier coefficients.

11. The system of claim 4, wherein the processing unit is programmed to generate at least one of a plurality of Fourier coefficients from the output interconnection array.

12. The system of claim 11, wherein the plurality of Fourier coefficients are defined by the following equation:

$$a_n = \Sigma_{j=1,3,5,\ldots N/n} \mu(j)(1/(2nj))\Sigma_{k=1,\ldots,2nj-1}(-1)^k A(k/(2nj)T)$$

wherein an $a_n$=sine coefficients of a periodic signal having a period=T;
$\mu(j)$=a Moebius function having values −1, 0 and 1; and
$A(t)$=a bandlimited RF signal.

13. The system of claim 12, wherein the at least one of a plurality of Fourier coefficients is generated by the processing unit and implemented by the control register to process the RF signal as a function of the at least one of a plurality of Fourier coefficients.

14. A system for pre-processing RF signals before input to an analog to digital (A-D) converter, the system comprising:
   an input interconnection array having a plurality of signal processing paths for receiving an RF signal;
   a delay matrix having a plurality of signal processing paths with delay elements to receive the RF signal from the input interconnection array, the delay matrix being arranged to apply a predetermined variable delay to the RF signal in each of the plurality of signal processing paths;

a summing matrix coupled to the delay matrix, the summing matrix being configured to combine the delayed RF signals from at least two of the signal processing paths of the delay matrix;

an output interconnection array coupled to a selector switch, wherein the output interconnection array having a plurality of output paths, the output interconnection array being coupled to the summing matrix for selectively forwarding at least one of the combined signals of the summing matrix to the selector switch;

a control register configured to receive instructions from a processing unit to control the input and output interconnection arrays, the delay matrix and the summing matrix;

an antenna for receiving RF signals;

a wideband filter coupled with the antenna for filtering the RF signal for processing;

an amplifier circuit for amplifying the filtered RF signal;

a gain control circuit for regulating the power of the RF signal for input to the input interconnection array; and an A-D converter coupled to the output of the selector switch for receiving the selected at least one of the combined RF signal and converting the combined RF signal to a digital representation of the combined RF signal.

15. The system of claim 14 further comprising a feedback path for feeding at least one of the combined signals of the summing matrix back to the input interconnection array.

16. The system of claim 14 wherein the amplifier circuit is a low-noise amplifier circuit.

17. The system of claim 14, wherein the gain control circuit is an automatic gain control circuit.

18. The system of claim 14, wherein the processing unit is programmed to generate at least one output coefficient of an FIR filter with +1/−1 coefficients from an input signal as given below:

$$y_m = \Sigma_{k=1,2,3,\ldots,N} b_k * x(m-(k-1)T)$$

wherein $y_m$=output coefficients of an FIR filter;
$b_{k=+}1/-1$ coefficients;
T=period; and
x(n)=an input signal.

19. A method of analyzing RF spectrum signals comprising:

receiving an RF signal;

filtering the RF signal through a wideband filter;

amplifying the RF signal with a low-noise amplifier;

controlling the power level of the RF signal for processing;

applying the RF signal across a plurality of signal processing paths;

having variable delay elements along each of the plurality of signal processing paths to obtain a delayed RF signal for each signal processing path;

combining the delayed RF signals of at least two of the signal processing paths according to a predetermined algorithm to create multiple simultaneous narrowband signal processing paths; and sampling the multiple simultaneous narrowband signal processing paths at a sampling rate which is dependent on the bandwidth of the signal processing path.

20. The method of claim 19, wherein the predetermined algorithm is selected from one of a plurality of Fourier coefficients.

21. The method of claim 20, wherein the Fourier coefficient is defined by the following equation:

$$a_n = \Sigma_{j=1,3,5,\ldots N/n} \mu(j)(1/(2nj)) \Sigma_{\kappa=1,\ldots,2nj-1} (-1)^k A(k/(2nj)T)$$

wherein $a_n$=sine coefficients of a periodic signal having a period=T;
$\mu(j)$=a Moebius function having values −1, 0 and 1; and
A(t)=A bandlimited RF signal.

22. The method of claim 20, wherein the Fourier coefficient is defined by cosine coefficients of a periodic signal.

* * * * *